United States Patent Office 3,709,849
Patented Jan. 9, 1973

3,709,849
COLD-SET PROCESS FOR THE PRODUCTION OF PHENOLIC NOVOLAK RESINOUS FOUNDRY CORES
Peter Herbert Richard Bryan Lemon, Sherfield, and Christopher Terron, Southampton, England, assignors to Borden, Inc., New York, N.Y.
No Drawing. Filed Dec. 3, 1969, Ser. No. 881,873
Int. Cl. C08g 51/24; C09d 5/02
U.S. Cl. 260—29.3
15 Claims

ABSTRACT OF THE DISCLOSURE

This invention relates to foundry cores having high strengths prepared by a cold-set process employing a first granular material coated with a liquid composition comprising a methylolated product in conjunction with a second granular refractory material coated with a mixture comprising an acidic material and a suspension or solution of phenolic novolak resin.

BACKGROUND OF THE INVENTION

This invention relates to a process for the production of foundry cores by a cold setting process.

Synthetic resin binders for granular refractory materials used in the preparation of cores and moulds for foundry use are well known. A number of processes have been proposed for the production of foundry cores, among which may be cited the hot box process in which a refractory composition containing a heat-curable binder is discharged into a mould or core box maintained at an elevated temperature and allowed to cure therein, and the so-called cold set process in which the mould or core box is unheated an the compositions employed are those which harden at room temperature. It has also been proposed to harden refractory binders at room temperature by passing gas through the refractory composition.

The hot box process has the advantage that cores may be produced in a comparatively short time and it is, therefore, most suitable for mass production processes. It has, however, the disadvantage that the necessity for the application of heat involves an additional expense and also makes it impossible to employ materials for the construction of the core box which are heat sensitive. The conventional cold set process avoids these disadvantages but is little suited to mass production since the setting time of the binder must be sufficiently slow to enable the moulding mixture to be prepared and fed into the core box.

Processes in which a gas is employed for curing can be conducted at a speed adequate for mass production and do not require the use of heat resistant moulds or core boxes. However, the necessity to provide means for introducing and venting the gas places restrictions on the core box construction and will generally require the use of cumbersome ancillary equipment.

It has been proposed, for example, in the specification of British Pat. No. 1,133,255 to produce foundry cores rapidly and economically in cold boxes by employing a granular refractory material coated with a synthetic resin binder in conjunction with a second granular refractory material coated with an extremely rapid-acting hardener for the synthetic resin, and employing a core making machine in which mixing of the two refractories is effected and the mixture discharged into the core box in a very short period of time. It has further been proposed to employ as binders for such a process non-aqueous resinous compositions such as polyurethanes and epoxide resins. Heretofore, the use of aqueous synthetic resin systems, such as the urea formaldehyde/furfuryl alcohol resins commonly employed in the hot box process, for the rapid production of cores by the cold process has given rise to difficulties. Specifically, it has been found that, although such products can be set rapidly by employing them in conjunction with an acid catalyst, the cores produced have exhibited poor strengths.

SUMMARY OF THE INVENTION

We have now found that foundry cores having high strengths may be produced rapidly in cold boxes by employing a first granular refractory material coated with a liquid composition comprising a methylolated product in conjunction with a second granular refractory material coated with a mixture comprising an acidic material and a suspension or solution of a phenolic novolak resin. When the first and second coated granular refractory materials are mixed rapidly and discharged substantially immediately thereafter into a cold core box or mould, shaped articles are produced which quickly develop adequate strength to enable them to be removed from the core box within a few minutes and which subsequently develop full strength on standing.

Accordingly, the present invention provides a process for the production of a foundry mould or core which comprises coating a first portion of granular refractory material with a methylolated product, coating a second portion of granular refractory material with a mixture of a suspension or solution of a phenolic novolak resin and an acidic material, rapidly mixing the two portions of coated refractory material and substantially immediately thereafter discharging the refractory mixture into a core box or mould.

The invention also provides a two-part foundry moulding composition comprising, as the one part, a granular refractory material coated with a methylolated product and, as the second part, a granular refractory material coated with a suspension or solution of a phenolic novolak resin and an acidic material.

DETAILED DESCRIPTION OF THE INVENTION

The granular refractory material may be any of those commonly employed in the production of foundry moulds and cores. Desirably, the granular refractory material is silica sand but other refractory materials, such as ground quartz, zircon, or chromite sands may be employed and additives, such as mill scale and plumbago, may be incorporated.

The methylolated product can be a reaction product of a phenolic compound, such as phenol, cresols or xylenols, a urea such as urea or thiourea, a triazine, such as melamine, or dicyandiamide with formaldehyde or a formaldehyde donor, e.g., para-formaldehyde or may be furfuryl alcohol or a furfuryl alcohol partial polymer or a reaction product of furfuryl alcohol with formaldehyde or a formaldehyde donor. Mixtures or co-condensates of any of these products may be employed and in applications where the presence of nitrogen is not detrimental co-condensates of urea with formaldehyde and furfuryl alcohol are particularly preferred. For many applications it is advantageous to prepare nitrogen-free cold-set mixtures and in such cases a nitrogen-free resin is employed as the methylolated product.

Where the methylolated product is a reaction product of a monohydric phenol and an aldehyde it may be prepared in the known ways by heating the phenol in the presence of the aldehyde in aqueous solution at a pH within the range 6–11 and preferably within the range 7–9 at a temperature within the range 60 to 105° C., and preferably within the range 70 to 100° C. and interrupting the ensuing reaction by cooling while the reaction product is still liquid and preferably before the dilutability has fallen below 1:0.5 (Resin:Water at 25° C.). If desired, the product may be concentrated by distillation and/or a solvent, such as methanol, ethanol or propanol may be included to reduce the viscosity of the product.

The ratio of phenol to aldehyde may be within the range 1:1 to 1:4 and preferably within the range 1:1.5 to 1:3. Where the proportion of aldehyde is higher, development of fume may be a problem during use while a lower proportion will generally provide a product with an inadequate setting rate. A urea formaldehyde reaction product suitable for the use as the methylolated component is prepared in any of the known ways by allowing urea to react with an aqueous formaldehyde solution in a molar ratio within the range 1:1 to 1:4 and preferably within the range 1:1.5 to 1:3, at a pH which is high enough to prevent the formation of an insoluble precipitate (commonly referred to as "Goldschmidt's compound"). The limiting pH value will depend upon the ratio of urea to formaldehyde employed and will be lower with high proportions of formaldehyde. Within the preferred molar ratio range 1:1.5 to 1:3 pH values within the range 6 to 9 and preferably 7–8 may be satisfactorily employed. The reaction may be interrupted at any stage after the formation of methylol ureas, as evidenced by "clouding" at temperatures below 40° C., or may be carried further by resinification after this stage at a pH between 3 and 7 and preferably at a pH between 4 and 6. The resinification reaction may be interrupted when desired by readjusting the pH to a value between 6 and 9 and preferably 7–8 and cooling if necessary. Desirably, the product is concentrated by distillation. The reaction may be conducted at any convenient temperature but it is preferred to employ an elevated temperature between 70° C. and 100° C. when resinification is effected. Where the reaction is to be curtailed at the methylol urea stage, however, it may conveniently be accomplished at room temperature.

The methylol component may also be furfuryl alcohol or a partial polymer of furfuryl alcohol made by condensing furfuryl alcohol under acid conditions and at elevated temperatures, preferably at a pH between 1 and 3 and at a temperature between 70 and 100° C. to a molecular weight between 98 and 300. Alternatively, furfuryl alcohol may be condensed with between 0.1 and 1 mole of formaldehyde per mole of furfuryl alcohol at a pH between 1 and 3. The preferred furfuryl alcohol/formaldehyde reaction product has a molar ratio of 0.2–0.4 mole of formaldehyde per mole of furfuryl alcohol and is prepared at a pH between 1.5 and 2.

The methylolated component may further be a cocondensation product of urea, formaldehyde and furfuryl alcohol. In this case the resin is prepared in a manner similar to that described for a urea-formaldehyde resin, except that the furfuryl alcohol is added before or during the condensation reaction which is carried out at a temperature between 70 and 105° C., and preferably 98–102° C. and the proportion of formaldehyde employed may be increased by an amount up to 0.6 mole for each mole of furfuryl alcohol employed. Similarly, cocondensation products of a phenol, formaldehyde and furfuryl alcohol may be prepared by incorporating furfuryl alcohol before or during the preparation of a phenol-formaldehyde resin as hereinbefore described in an amount from 0–20 mole of furfuryl alcohol per mole of phenol, the formaldehyde being increased, if desired, by an amount up to 0.6 mole per mole of furfuryl alcohol employed.

The methylolated component may also be cocondensation product of phenol and urea with formaldehyde, the preferred proportions being between 0.5 and 2.0 moles of phenol per mole of urea and the proportion of formaldehyde being between 1 and 3.5 moles per mole of phenol and urea taken together and preferably between 1.5 and 2.5 moles. The reaction conditions employed are those hereinbefore described for urea-formaldehyde resins.

Suitable methylolated products in accordance with the invention may comprise mixtures of any of the foregoing products.

In order that the coatings on the several portions of the granular refractory material may interact effectively in the cold upon mixing it is necessary that they should be in liquid form. Such coatings are therefore distinct from those proposed for use in shell moulding which are substantially solvent-free, non-tacky, solid coatings. It is to be understood, however, that the coatings in accordance with the present invention may comprise liquid solutions or dispersions of normally solid materials.

The phenolic novolak employed as a component of the coating on the second portion of granular refractory material may be any conventional fusible phenolic novolak. The phenolic component of the novolak may be any phenolic compound which is unsubstituted on the ring positions ortho and para to the phenolic hydroxyl group, such as phenol, m-cresol, 3,5-xylenol, or resorcinol. Commercially available mixtures of phenols containing a major proportion of material unsubstituted in the ortho and para/positions may be satisfactorily employed. The preferred aldehydic component of the novolak is formaldehyde or a formaldehyde donor such as paraformaldehyde, but other aldehydes, such as acetaldehyde and particularly furfuraldehyde may be used in complete or partial replacement of the formaldehyde.

The molar ratio of phenol to formaldehyde should be between 1:0.5 and 1:0.9, preferably between 1:0.7 and 1:0.86. If less than 0.5 molar proportions of formaldehyde are employed the end product will have an undesirably low melting point while with the amounts in excess of about 0.9 molar proportions the melting point will be undesirably high and there is, in addition, a danger that slight inaccuracies in weighing could result in gelation during manufacture.

The preferred catalyst for the production of the novolak resin is sulphuric acid. Other conventional catalysts for the production of novolak resins may, however, be used. Such catalysts include hydrochloric and oxalic acids, zinc borate and zinc acetate. The novolak component may be prepared in any of the known ways. Typically the phenol and catalyst are charged to a jacketed vessel and heated to 100° C., the formaldehyde being added slowly in the form of an aqueous solution at such a rate as to maintain a vigorous reflux without external heating. When all the formaldehyde has been charged heating is applied to maintain a temperature of 120° C. for a further 1–2 hours. The resin is then dehydrated and the anhydrous residue maintained at 140–160° C. until the melting point has reached the desired value within the range 35–70° C. and preferably within the range 40–60° C.

Alternatively, although less desirably, the formaldehyde may be charged together with the phenol and the catalyst and the whole raised cautiously to a temperature of 40–60° C. to initiate the reaction. In this case, the exothermic heat of reaction will generally be sufficient to raise the temperature to 100° C. after which external heating may be gradually reapplied to complete the reaction. In this case the resin is subsequently dehydrated and maintained at elevated temperature until the desired melting point is attained, as in the foregoing case.

The acidic material employed in admixture with the phenolic novolak may be any material capable in the proportion used, of effecting a reduction in the pH of the mixed granular refractory coatings. Suitable materials are mineral acids, such as sulphuric acid, ortho phosphoric acid, and hydrochloric acid; organic acids, such as p-toluene sulphonic acid, benzene sulphonic acid or oxalic acid; acidic salts, such as zinc chloride, aniline hydrochloride or aluminum chloride; or mixtures thereof. It will be apparent to those skilled in the art that the rate of reaction of the coating compositions will be affected by pH of the mixed system and may be controlled by variation of the amount and strength of the acidic material employed. It is preferred to employ an amount of acid which will reduce the pH of the mixture of methylolated product and novolak to a value between 0.5 and 2.0.

The invention may conveniently be carried into effect by coating a granular refractory material, typically sand, in any convenient manner, typically in a heavy duty foundry mixer, with from 0.5 to 5 percent of its weight of a methylolated product and charging the product to a feed chamber of a core-blowing machine as described, for example, in the specification of British Pat. No. 1,133,255, similarly coating in a separate operation a second quantity of granular refractory material with a mixture of a phenolic novolak and an acidic material, and charging this product to a second feed chamber, subsequently simultaneously discharging the two coated products, preferably in approximately equal quantities, into a common chamber where mixing is effected and finally discharging the mixed product into a core-box or mould before the mixture sets. In view of the rapid onset of gelation in the mixed coatings the transport and discharge of the coated granules is preferably effected by means of compressed air or other compressed gas.

One of the advantages of the process according to the present invention is that the two portions of refractory material may be mixed in approximately equal quantities without resulting in a product containing excess acid. In prior processes care had to be taken to apply the conventional acid catalyst in small proportions which made automatic metering difficult.

The following examples, in which all parts and percentages are by weight illustrate the invention.

EXAMPLE 1

4369 parts of 44 percent formaldehyde solution were charged into a resin kettle and adjusted with sodium hydroxide solution to a pH of 8.3 to 8.8. 1410 parts of urea were then added and the mixture heated to reflux temperature with stirring. After boiling under reflux conditions for 20 minutes the mixture was cooled under vacuum to 55° to 60° C. and the pH adjusted to 7.5 with 1.8% hydrochloric acid solution. 1420 parts of water were removed by distillation under vacuum and 4210 parts of furfuryl alcohol were added. The pH was then reduced to 5.0 with 1.8% hydrochloric acid solution and the mixture heated until a viscosity of 30 centistokes was achieved. The pH was raised to 7.0 with a 32% solution of sodium hydroxide and 1780 parts distillate removed by distillation under vacuum. 2090 parts of furfuryl alcohol were then added and the pH readjusted to 5.9 to 6.1 with an 11% solution of hydrochloric acid. Fnally 36 parts of gamma-aminopropyltriethoxy silane were stirred in and the mixture cooled to room temperature and discharged. The resulting product is hereinafter referred to as 'Resin A'.

In a separate vessel 7265 parts of 100 percent phenol and 100 parts of 98 percent sulphuric acid were mixed and heated to 100° C. 2635 parts of 44 percent formaldehyde solution were then charged slowly over a period of 1½ hours at such a rate as to keep the exothermic reaction under control. The temperature was then maintained at 100° C. for a further hour under reflux conditions. Distillation was then carried out under atmospheric pressure until the contents of the kettle attained a temperature of 150° C. 400 parts of methanol were added and the reactants cooled to 100° C. Finally 1000 parts of 98 percent sulphuric acid and 1000 parts of phosphoric acid (specific gravity 1.75) were added slowly and the resultant novolak-acid mixture discharged. The resulting product is hereinafter referred to as 'Resin B'.

3000 parts of Redhill F and sand were coated by mixing in a conventional, heavy-duty mixer with 90 parts of Resin A and were then charged into a storage container of a core-blowing apparatus as described in the specification of Pat. No. 1,133,255. A further 3000 parts of Redhill F were similarly coated with 90 parts of 'Resin B' and placed in a second storage container of the same apparatus.

The apparatus was set to deliver equal quantities of the two coated sands into a common mixing chamber and thence into a core-box at room temperature and a series of test cores was then produced. The cores were stripped from the core-box after 30 seconds and their compression strengths determined at intervals after stripping. The following results were obtained:

| Time at room temperature after stripping from core box | Compression strength, p.s.i. |
|---|---|
| 1 minute | 25.5 |
| 1 hour | 410.0 |
| 16 hours | 570.0 |

For the purpose of comparison these results may be contrasted with those obtained from urea formaldehyde resin compositions described in our copending application No. 1331/68 in which the sand moiety comprising the acid catalyst contained no novolak resin. In this case the strip time was 2 minutes and the maximum compression strength achieved after 1 hour at 25° C. was 320 pounds per square inch.

In general, we have found that while the strip time may be reduced by decreasing the pH of the mixed system, for example, by increasing the strength or amount of acid employed in the acidic sand portion, there is invariably a consequent reduction in the strength of the core produced. Thus when the strip time of the composition employed in the foregoing comparative example was reduced to 30 seconds the compressive strength was even lower.

By way of providing a further illustration of the inferior results obtained when novolak resin is omitted, cores were produced using equal quantities of a sand coated with 3¾ percent of 'Resin A' and a sand coated with 15/16 of 1 percent of a mixture of equal parts of 98 percent sulphuric acid and phosphoric acid (specific gravity 1.75) by the method described above. The cores could be stripped from the core box in 30 seconds but developed an average compression strength of only 177 pounds per square inch on standing for 1 hour at room temperature.

EXAMPLE 2

This example illustrates the use of a resorcinol-formaldehyde resin as the novolak component in conjunction with Resin A of Example 1 as the methylolated compound.

134 parts of a commercial coal tar distillate fraction containing 80 percent of resorcinol, 10 percent of catechol and 10 percent of other phenols, 110 parts of resorcinol flake and 21 parts of 44 percent formaldehyde solution were charged into a jacketed resin kettle and adjusted to a pH of 3.4 to 3.6 with 90 percent formic acid. The reactants were then cautiously heated under reflux conditions to 100° C. and maintained at this temperature for 3 hours. The resin thus formed was then dehydrated under vacuum at 60° C. to 80 percent solids and is hereinafter referred to as Resin C.

100 parts of Resin C were then mixed with 50 parts of 98 percent sulphuric acid and 50 parts of p-toluene sulphonic acid and 15.4 parts of the mixture so produced were employed to coat 1000 parts of Redhill F sand.

A further 1000 parts of Redhill F sand were then separately coated with 24.6 parts of Resin A of Example 1.

The two coated sands were then employed by the method described in Example 1 to produce test cores, which were removed from the core box after 30 seconds and tested at intervals to give the following results:

| Time after blowing before testing: | Compression strength, p.s.i. |
|---|---|
| 1 minute | 18 |
| 1 hour | 350 |
| 16 hours | 320 |

EXAMPLE 3

This example illustrates the use of a phenol-formaldehyde resole as the methylolated compound with a phenol-formaldehyde high ortho novolak as the novolak component.

4065 parts of 100 percent phenol, 5884 parts of 44 percent formaldehyde solution and 51 parts of magnesium hydroxide were heated cautiously to 75° C. under reflux conditions using vacuum to control the reaction. After maintaining the reaction mixture at a temperature of 75° C. for 35 minutes the resin thus formed was concentrated by distillation under vacuum to a solids content of 80 percent and then heated further at 75° C. until a sample just clouded when diluted with 3.5 times its weight of water at 21° C. The resulting product is hereinafter referred to as Resin D.

A high ortho novolak resin was separately prepared by reacting phenol and 44 percent formaldehyde solution in a ratio of 1:0.66 in the presence of 0.75 percent of zinc borate and dehydrating the product by distilling at atmosphere pressure until the temperature had risen to 155° C. The resin was then held at this temperature until the melting point had risen to 53° C. This product was mixed while molten with 50 percent of its weight of 98 percent sulphuric acid.

Resin D was mixed with Redhill F sand in an amount of 1.6 percent of the weight of the sand and the mixture of novolak resin and acid used to coat a second quantity of Redhill F sand in an amount of 2.4 percent of the weight of the sand. The coated sands were then employed to produce cores by the method described in Example 1, except that the stripping time was found to be considerably longer and cores of lower strength were produced. The cores were, however, nitrogen-free and of utility where this property is of importance.

We claim:

1. A cold set process for the production of a foundry core which comprises coating a first portion of granular refractory material selected from the group consisting of sand, ground quartz, zircon and mixtures thereof with 0.5 to 5% of a liquid solution or dispersion of a methylolated component; coating a second portion of said granular refractory material with 0.5 to 5% of a mixture of a suspension or solution of a phenolic novolak resin and an acidic material selected from mineral acids, organic acids, acidic salts and mixtures thereof, amount of the acidic material being sufficient to reduce pH of the mixture of the methylolated component and the novolak resin to value between about 0.5 and 2.0; rapidly mixing the two portions of coated refractory materials; substantially immediately thereafter discharging the refractory mixture into a core box or mold maintained at ambient temperature; maintaining the core box at ambient temperature for sufficient duration to allow the core to set; and then removing the thus formed shaped core.

2. A process of claim 1, wherein the granular refractory material is silica sand.

3. The process of claim 1, wherein the novolak resin is derived from a first reactant selected from the group consisting of phenolic compounds, unsubstituted on the ring positions ortho and para to the phenolic hydroxyl group and mixtures thereof and a second reactant comprising a formaldehyde donor, the molar ratio of the first reactant to the formaldehyde being from 1:05 and 1:09.

4. The process of claim 1, wherein the methylolated component is a reaction product of a first reactant compound selected from the group consisting of phenol, cresol and xylenol and a formaldehyde donor wherein the molar ratio of the first reactant and the formaldehyde donor is between 1:1 and 1:4.

5. The process of claim 1, wherein the methylolated component is a reaction product of a first reactant compound selected from the group consisting of urea, thiourea, triazine and dicyandiamide and a formaldehyde donor wherein the molar ratio of the first reactant to the formaldehyde donor is between 1:1 and 1:4.

6. The process of claim 1, wherein the methylolated component is the reaction product of furfuryl alcohol or a partial polymer of furfuryl alcohol and a formaldehyde donor, in a molar ratio of 0.2 to 0.4 moles of formaldehyde per mole of furfuryl alcohol.

7. The process of claim 1, wherein the methylolated component is a co-condensation resin of the reaction product of a first reactant compound selected from the group consisting of urea, thiourea, triazine and dicyandiamide, a formaldehyde donor wherein the molar ratio of the first reactant to the formaldehyde donor is between 1:1 and 1:4, and furfuryl alcohol, said alcohol being added before or during the condensation reaction of the first reactant and the formaldehyde donor.

8. The process of claim 1, wherein the methylolated component is a co-condensation product of a first reactant compound selected from the group consisting of phenol, cresol and xylenol, a formaldehyde donor wherein the molar ratio of the first reactant and the formaldehyde donor is between 1:1 and 1:4 and furfuryl alcohol, said alcohol being added before or during the condensation reaction of the first reactant and formaldehyde donor.

9. The process of claim 1, wherein the methylolated component is a co-condensation product of phenol and urea with formaldehyde, the molar proportion being between 0.5 and 2.0 moles of phenol per mole of urea and the proportion of formaldehyde being between 1.0 to 3.5 moles per mole of phenol and urea taken together.

10. Process of claim 1 wherein amounts of the first and second portions of the granular material are about equivalent; the methylolated component is selected from furfuryl alcohol, partial polymer of furfuryl alcohol, furfuryl alcohol/urea-formaldehyde, phenol-furfuryl alcohol-formaldehyde, phenol - urea - formaldehyde, reaction product of a first reactant and a second reactant, and mixtures thereof, said first reactant is selected from phenol, cresols, xylenols, urea, thiourea, triazines, dicyandiamide and furfuryl alcohol and said second reactant is selected from formaldehyde and formaldehyde donor; and the acidic material is selected from sulfuric acid, ortho phosphoric acid, hydrochloric acid, p-toluene sulphonic acid, benzene sulphonic acid, oxalic acid, zinc chloride, aniline hydrochloride, aluminium chloride and mixtures thereof.

11. Process of claim 10 wherein amount of said acidic material is sufficient to reduce pH of the mixture of the methylolated product and the novolak resin to a value between 0.5 and 2.0 and wherein said first and second portions of refractory material are substantially equal in weight.

12. Process of claim 10 wherein the triazine is melamine and the first and second portions of said granular refractory material are at room temperature during curing.

13. Process of claim 1 wherein the methylolated component is a reaction product of phenol and formaldehyde of phenol to formaldehyde mole ratio from 1:1 to 1:4, the reaction being interrupted by cooling while the reaction product is still liquid.

14. Process of claim 1 wherein the methylolated component is a reaction product of phenol and formaldehyde with respective mole ratios of from 1:1 to 1:4, the reaction being interrupted before the dilutability of the reaction product falls below 1:0.5.

15. A process of claim 1, wherein the acidic material is a mineral acid in an amount so as to reduce the pH of the mixture of methylolated product and novolak resin to a value of between 0.5 and 2.0.

References Cited

UNITED STATES PATENTS

| | | | |
|---|---|---|---|
| 3,306,864 | 2/1967 | Lang et al. | 260—38 |
| 2,999,833 | 9/1961 | Bleuenstein | 260—38 |
| 2,913,787 | 11/1959 | Cooper | 260—38 |
| 2,970,121 | 1/1961 | Schmittberger | 260—38 |
| 3,539,484 | 11/1970 | Bowman et al. | 260—29.3 |

DONALD J. ARNOLD, Primary Examiner

U.S. Cl. X.R.

260—29.4 R, 38, 57 C, 838, 839, 840